(12) United States Patent
Huang

(10) Patent No.: US 9,122,970 B2
(45) Date of Patent: Sep. 1, 2015

(54) ELECTRONIC CARD CONNECTOR AND ELECTRONIC DEVICE HAVING THE SAME

(71) Applicant: WISTRON CORP., New Taipei (TW)

(72) Inventor: Kuo-Che Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/290,764

(22) Filed: May 29, 2014

(65) Prior Publication Data

US 2015/0207249 A1 Jul. 23, 2015

(30) Foreign Application Priority Data

Jan. 17, 2014 (TW) .............................. 103201082 U

(51) Int. Cl.
  *H01R 13/62* (2006.01)
  *G06K 13/08* (2006.01)
  *H01R 12/71* (2011.01)
  *H01R 13/629* (2006.01)

(52) U.S. Cl.
  CPC .......... *G06K 13/0862* (2013.01); *H01R 12/716* (2013.01); *H01R 13/629* (2013.01); *H01R 13/62955* (2013.01)

(58) Field of Classification Search
  CPC ................................................ G06K 13/0862
  See application file for complete search history.

(56) References Cited

U.S. PATENT DOCUMENTS

| | | | | | |
|---|---|---|---|---|---|
| 4,887,188 | A | * | 12/1989 | Yoshida et al. | 361/679.31 |
| 5,226,826 | A | * | 7/1993 | Nillson et al. | 439/72 |
| 5,986,891 | A | * | 11/1999 | Sugimoto | 361/737 |
| 6,024,593 | A | * | 2/2000 | Hyland | 439/326 |
| 6,062,889 | A | * | 5/2000 | Hyland et al. | 439/326 |
| 6,174,188 | B1 | * | 1/2001 | Martucci | 439/326 |
| 6,234,844 | B1 | * | 5/2001 | Somerville et al. | 439/630 |
| 6,241,545 | B1 | * | 6/2001 | Bricaud et al. | 439/326 |
| 6,468,101 | B2 | * | 10/2002 | Suzuki | 439/326 |
| 7,682,178 | B2 | * | 3/2010 | Feng | 439/326 |
| 2005/0142902 | A1 | * | 6/2005 | Juret et al. | 439/76.1 |

FOREIGN PATENT DOCUMENTS

TW  M355484 U  4/2009

* cited by examiner

*Primary Examiner* — James Harvey
(74) *Attorney, Agent, or Firm* — Muncy, Geissler, Olds & Lowe, P.C.

(57) ABSTRACT

An electronic card connector comprises a base, a cover and a limiting element. The base has an electronic card holder for holding an electronic card. The cover is pivoted on the base so that the cover is able to be operated in an open state and a close state relative to the base. When in the close state, the cover is configured for sliding relative to the base and therefore has a fastening position and a release position. The limiting element is connected to the cover and has an unstressed state and a stressed state relative to the cover. The limiting element comprises an elastic arm and at least one limiting block. The elastic arm is connected to the cover via a connecting end while the at least one limiting block is connected to an end other than the connecting end of the elastic arm.

23 Claims, 16 Drawing Sheets

ELECTRONIC CARD CONNECTOR AND ELECTRONIC DEVICE HAVING THE SAME

CROSS-REFERENCE TO RELATED APPLICATIONS

This non-provisional application claims priority under 35 U.S.C. §119(a) on Patent Application No(s). 103201082 filed in Taiwan, R.O.C. on 2014 Jan. 17, the entire contents of which are hereby incorporated by reference.

TECHNICAL FIELD

The disclosure relates to a connector, more particularly to an electronic card connector and an electronic device having the same.

BACKGROUND

Nowadays electronic products such as notebooks, mobile phones, tablet computers are widely used in people's daily life. These electronic products are usually equipped with an electronic card connector for being equipped with subscriber identity module card (SIM card), memory card, etc.

The electronic card connector for SIM card usually comprises a base and a cover pivoted on the base. When the cover is lifted, the electronic card may be disposed on the base or be removed from the base. The electronic card can be fixed to the place between the base and the cover when the cover is closed. For ensuring the reliability of the products, these potable electronic devices need to go through drop tests with stringent standards before finishing the production. However, when the fastening structure between the base and the cover is badly designed, the fastening connection could be released unexpectedly if the portable electronic device drops out and hit the ground. Since the user is unaware of the fact that the fastening connection is no longer secure, the user may open the portable electronic device as usual in order to change the battery. The electronic card, therefore, may fall. Hence, it is important to improve the structure strength of the fastening connection between the cover and the base.

SUMMARY

An electronic card connector comprises a base, a cover and a limiting element. The base has an electronic card holder for holding an electronic card. The cover is pivoted on the base so that the cover is able to be operated in an open state and a close state relative to the base. The cover is configured to slide relative to the base between a fastening position and a release position when the cover is operated in the close state. The limiting element is connected to the cover and has an unstressed state and a stressed state relative to the cove. The limiting element comprises an elastic arm and at least one limiting block. The elastic arm is connected to the cover via a connecting end while the at least one limiting block is connected to an end other than the connecting end of the elastic arm. When the elastic arm is in the unstressed state, the position of the at least one block is above the cover. When the elastic arm is in the stressed state, the position of at least a part of the at least one limiting block is below the cover. Thus, the cover is avoided moving to the release position from the fastening position when the cover is in the close state, so that the cover is fixed at the fastening position accordingly.

An electronic device comprises a circuit board, a detachable component and an electronic card connector. The detachable component is connected to the electronic device in a detachable manner. The electronic card connector is disposed and is electrically connected to the circuit board. The electronic card connector comprises a base, a cover and a limiting element. The base has an electronic card holder for holding an electronic card. The cover is pivoted on the base so that the cover is able to be operated in an open state and a close state relative to the base. The cover is configured to slide relative to the base between a fastening position and a release position when the cover is operated in the close state. The limiting element is connected to the cover and has an unstressed state and a stressed state relative to the cove. The limiting element comprises an elastic arm and at least one limiting block. The elastic arm is connected to the cover via a connecting end while the at least one limiting block is connected to an end other than the connecting end of the elastic arm. When the elastic arm is in the unstressed state, the position of the at least one block is above the cover. When the elastic arm is in the stressed state, the position of at least a part of the at least one limiting block is below the cover. Thus, the cover is avoided moving to the release position from the fastening position when the cover is in the close state, so that the cover is fixed at the fastening position accordingly.

BRIEF DESCRIPTION OF THE DRAWINGS

The present disclosure will become more fully understood from the detailed description and the drawings given herein below for illustration only, and thus does not limit the present disclosure, wherein.

DETAILED DESCRIPTION

Figure 1A:
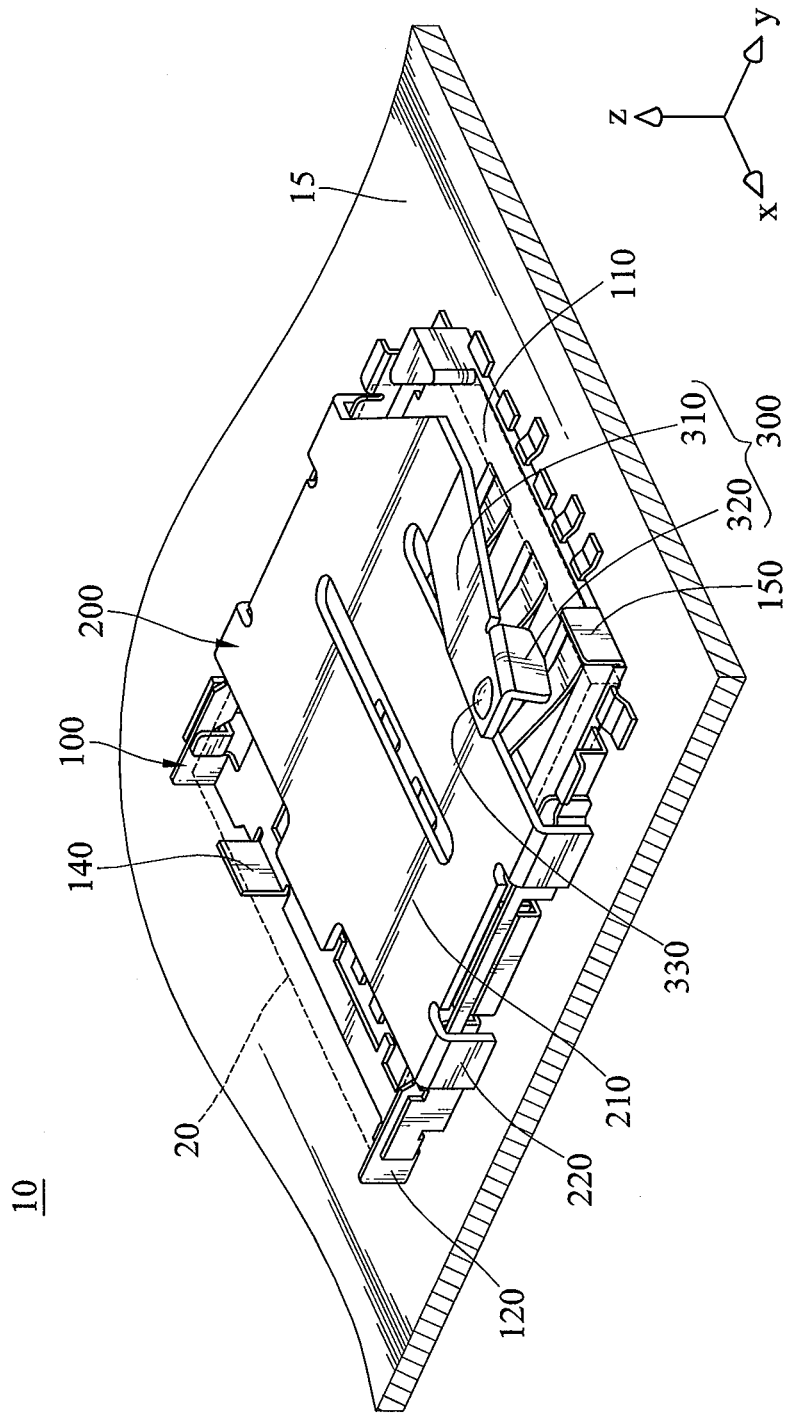
FIG. 1A is a perspective view of an electronic card connector installed on a circuit board of an electronic device according to the first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
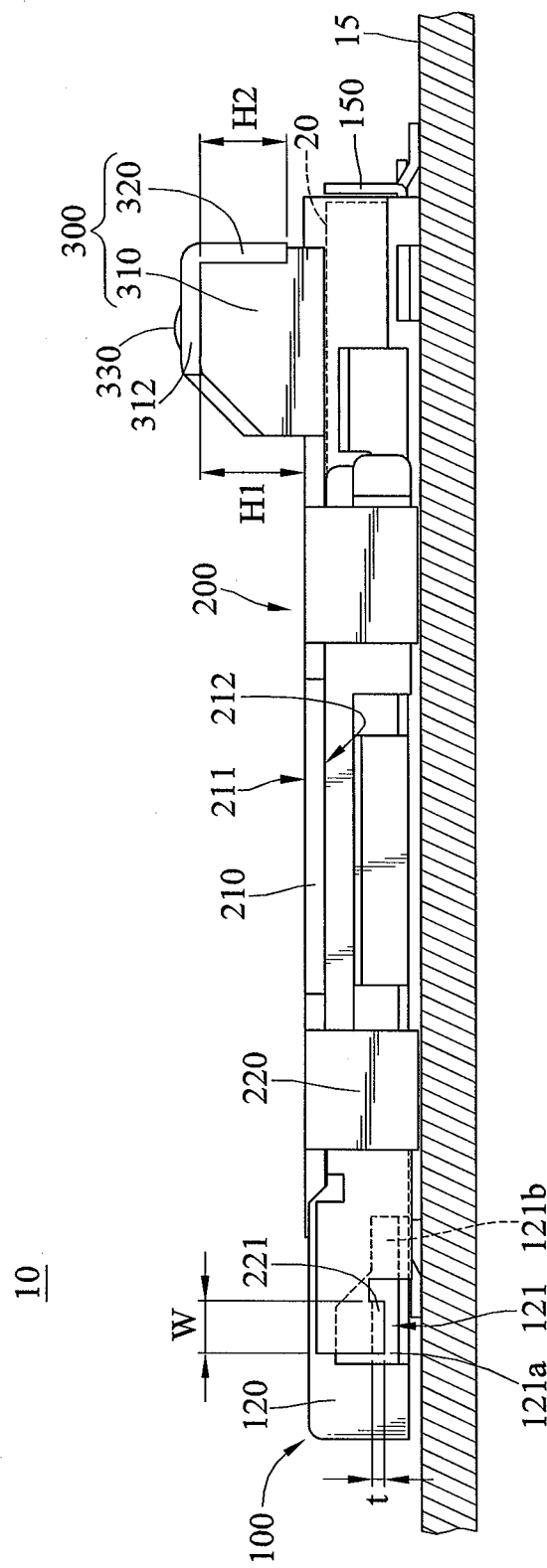
FIG. 1B is a side view of FIG. 1A.
Figure 2:
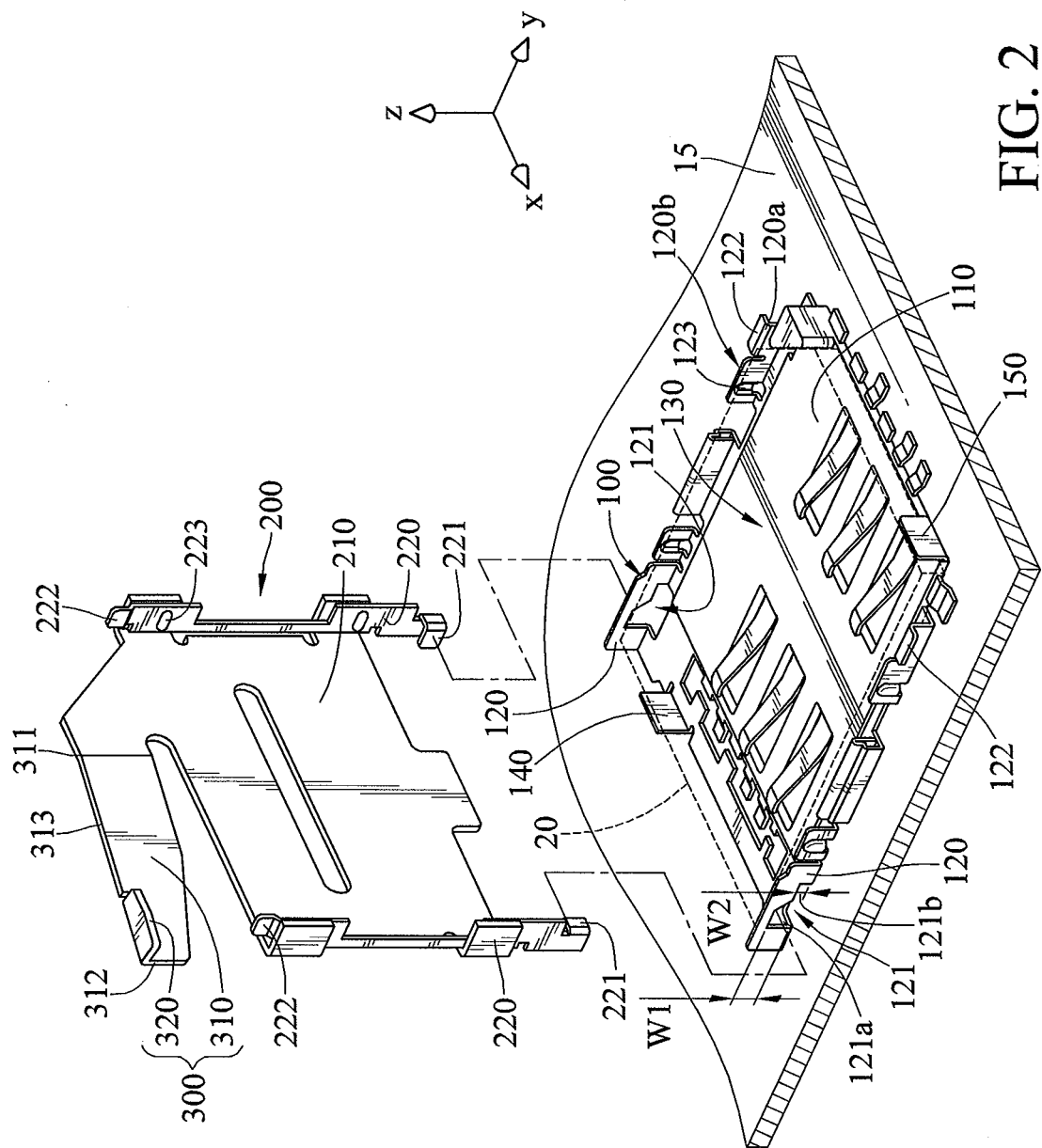
FIG. 2 is an exploded view of FIG. 1A.
Figure 3:
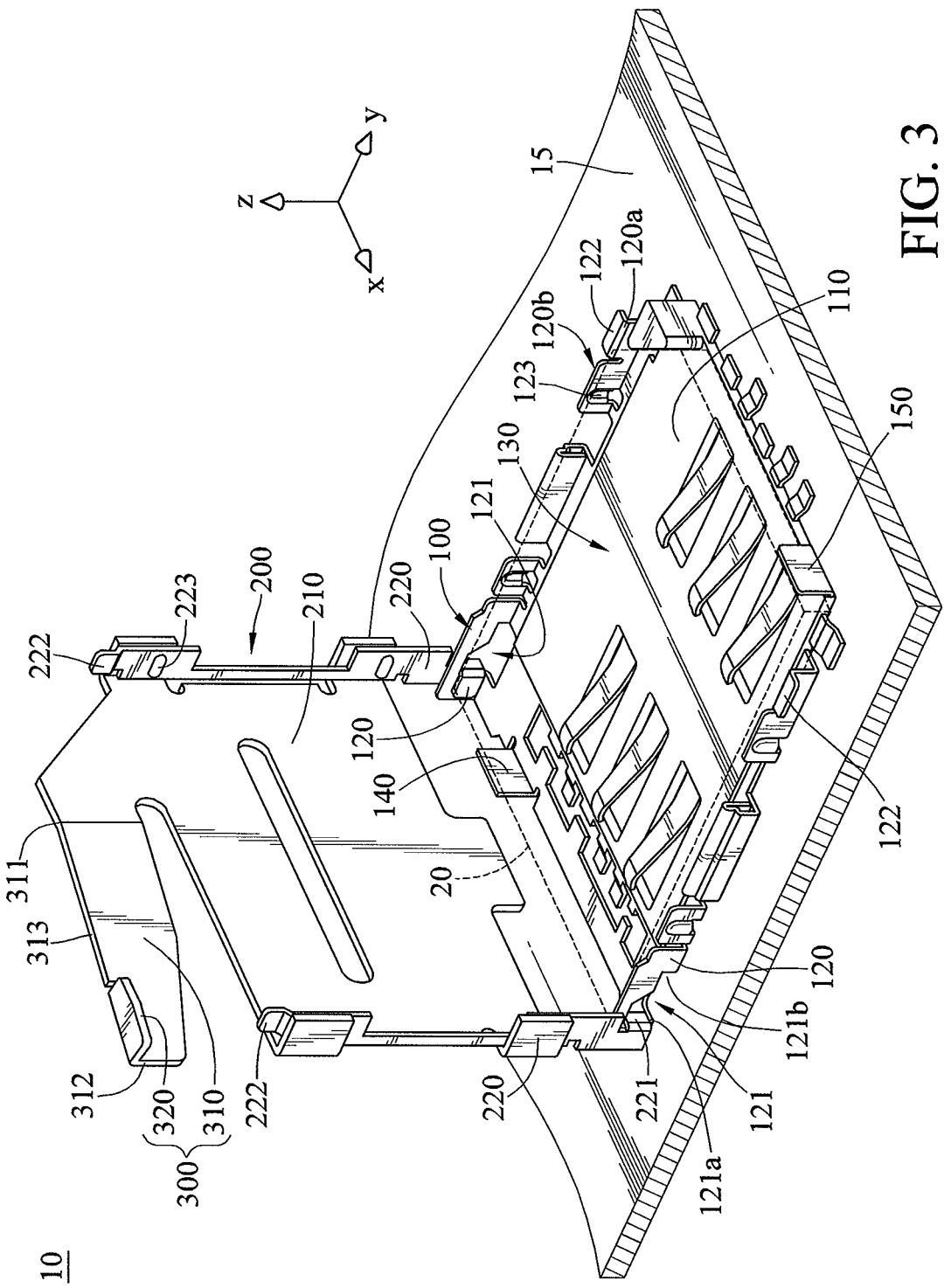
FIG. 3 is a perspective view of the electronic card connector whose cover is lifted.

FIG. 1A is a perspective view of an electronic card connector installed on a circuit board of an electronic device according to the first embodiment of the disclosure; FIG. 1B is a side view of FIG. 1A; FIG. 2 is an exploded view of FIG. 1A; FIG. 3 is a perspective view of the electronic card connector whose cover is lifted. As seen in FIG. 1A to FIG. 3, the electronic card connector 10 of this embodiment is installed on the circuit board 15 of the electronic device, for example. The circuit board 15 may be a circuit board of a tablet computer or a circuit board of a cell phone.

The electronic card connector 10 comprises a base 100, a cover 200 and a limiting element 300.

The base 100 is installed on the circuit board 15 and comprises a bottom plate 110, two side walls 120, a first blocking wall 140 and a second blocking wall 150.

The two side walls 120 are located on opposite two sides of the bottom plate 110 for making the two side walls 120 and the bottom plate 110 together form the electronic card holder 130. In other words, the electronic card holder 130 is surrounded by the two side walls 120 and the bottom plate 110. The electronic card holder 130 is used for accommodating the electronic card 20 so that the freedom of movement along X axis of the electronic card 20 is limited by the side walls 120. The electronic card 20 is, for example, a SIM card or a memory card. Each of the side walls 120 has a sliding groove 121, a first anti-lift portion 122 and a first non-slip portion 123. The two sliding grooves 121 respectively extend from one end of the two side walls 120 along a sliding direction (namely Y axis direction) and have a pivoting end the pivoting end 121a and a limiting end the limiting end 121b in sequence. The width of the pivoting end 121a of the sliding groove 121 is greater than that of the limiting end 121b of the sliding groove 121. The two first anti-lift portions 122 are located on the other end of the side walls 120 and extend from the top end 120a of the two side walls 120 outwardly and protrude from the outer lateral side 120b of the two side walls 120. The first non-slip portion 123 is located between the sliding groove 121 and the first anti-lift portion 122 and protrudes from the outer lateral side 120b of the side walls 120 respectively.

In this embodiment, the first non-slip portion 123 is located between the sliding groove 121 and the first anti-lift portion 122 but the disclosure is not limited thereto. In other embodiments, the first non-slip portion 123 and the first anti-lift portion 122 interchange.

The first blocking wall 140 and the second blocking wall 150 are arranged on the sliding direction of the electronic card holder 130 (namely Y axis direction) and the first blocking wall 140 is near the sliding groove 121. The first blocking wall 140 and the second blocking wall 150 are for limiting the freedom of movement of the electronic card 20 along Y axis direction. However, in other embodiments, the second blocking wall 150 may be omitted.

The cover 200 is pivoted on the base 100 and has an open state and a close state relative to the base 100. In the close state, the cover 200 is configured for sliding relative to the base 100 and therefore has a fastening position and a release position. Specifically, the cover 200 comprises a top plate 210 and two lateral plates 220. The two lateral plates 220 are located on opposite two sides of the top plate 210. One end of each of the lateral plates 220 has a pivoting block 221. The shape of the pivoting block 221 is tabular and the width W of the pivoting block 221 is less than the width W1 of the pivoting end 121a of the sliding groove 121, but it is greater than the width W2 of the limiting end 121b of the sliding groove 121. The width W of the pivoting block 221 is less than the width W2 of the limiting end 121b of the sliding groove 121. The pivoting block 221 is located inside the sliding groove 121 in a rotatable and movable manner. Since the width W1 of the sliding groove 121 is greater than the width of the pivoting block 221, when the pivoting block 221 is at the pivoting end 121a of the sliding groove 121, the cover 200 can rotate relative to the base 100 and therefore has the open state (as shown in FIG. 3) and the close state (as shown in FIG. 1A). Since the width t of the pivoting block 221 is less than the width W2 of the limiting end 121b of the sliding groove 121 when the cover 200 is at the close state, the cover 200 can slide relative to the base 100 and therefore has the release position and the fastening position. The movement of the cover 200 will be explained later.

In this and some other embodiments, the lateral plates 220 of the cover 200 further has a second anti-lift portion 222 and a second non-slip portion 223. The position of the second anti-lift portion 222 corresponds to that of the first anti-lift portion 122 while the position of the second non-slip portion 223 corresponds to that of the first non-slip portion 123. When the cover 200 is at the fastening position, the second anti-lift portion 222 is configured for fastening with the first anti-lift portion 122 and the first non-slip portion 123 is fastened with the second non-slip portion 223, thereby causing the cover 200 unlikely to slide or to lift relative to the base 100.

The limiting element 300 is connected to the cover 200 and has an unstressed state and a stressed state relative to the cover 200. Specifically, the limiting element 300 comprises an elastic arm 310, at least one limiting block 320 and a protruding block 330. For explanation, the structure of the limiting element 300 is illustrated when the cover 200 is in the close state. The elastic arm 310 extends along X axis direction (perpendicular to the sliding direction) and therefore has a connecting end 311 and a moving end 312 opposite to each other. That is, the extending direction of the elastic arm 310 is perpendicular to the sliding direction of the cover 200 (parallel to Y axis direction). The connecting end 311 of the elastic arm 310 is connected to the top plate 210 of the cover 200. The limiting block 320 is connected to the moving end 312 of the elastic arm 310, protrudes towards the bottom plate 110 and is perpendicular to the elastic arm 310 for forming an L-shape structure. The top plate 210 has the top side 211 and the bottom side 212 opposite to each other. When the cover 200 is in the close state, the top side 211 of the top plate 210 faces away from the bottom plate 110. In this embodiment, the position of the moving end 312 of the elastic arm 310 is above the position of the top side 211 of the top plate 210 while the vertical distance H1 from the moving end 312 to the top plate 210 is greater than the height H2 of the limiting block 320 so that it protrudes. As a result, the position of the limiting block 320 is above the top side 211 of the top plate 210 in normal circumstances (namely when the limiting block 320 is in the unstressed state) for avoiding interference with the electronic card 20. By comparison, when the limiting element 300 is pressed by an external force, the elastic arm 310 elastically deforms and makes the limiting block 320 move towards the bottom plate 110 (in which the limiting block 320 is in the stressed state). The limiting block 320 is forced to drop from the position above the top side 211 of the top plate 210 to the position below the bottom side 212. The protruding block 330 is located on one side of the elastic arm 310 away from the bottom plate 110 and near the moving end 312 of the elastic arm 310. The function of the protruding block 330 will be illustrated later.

Figure 4A:
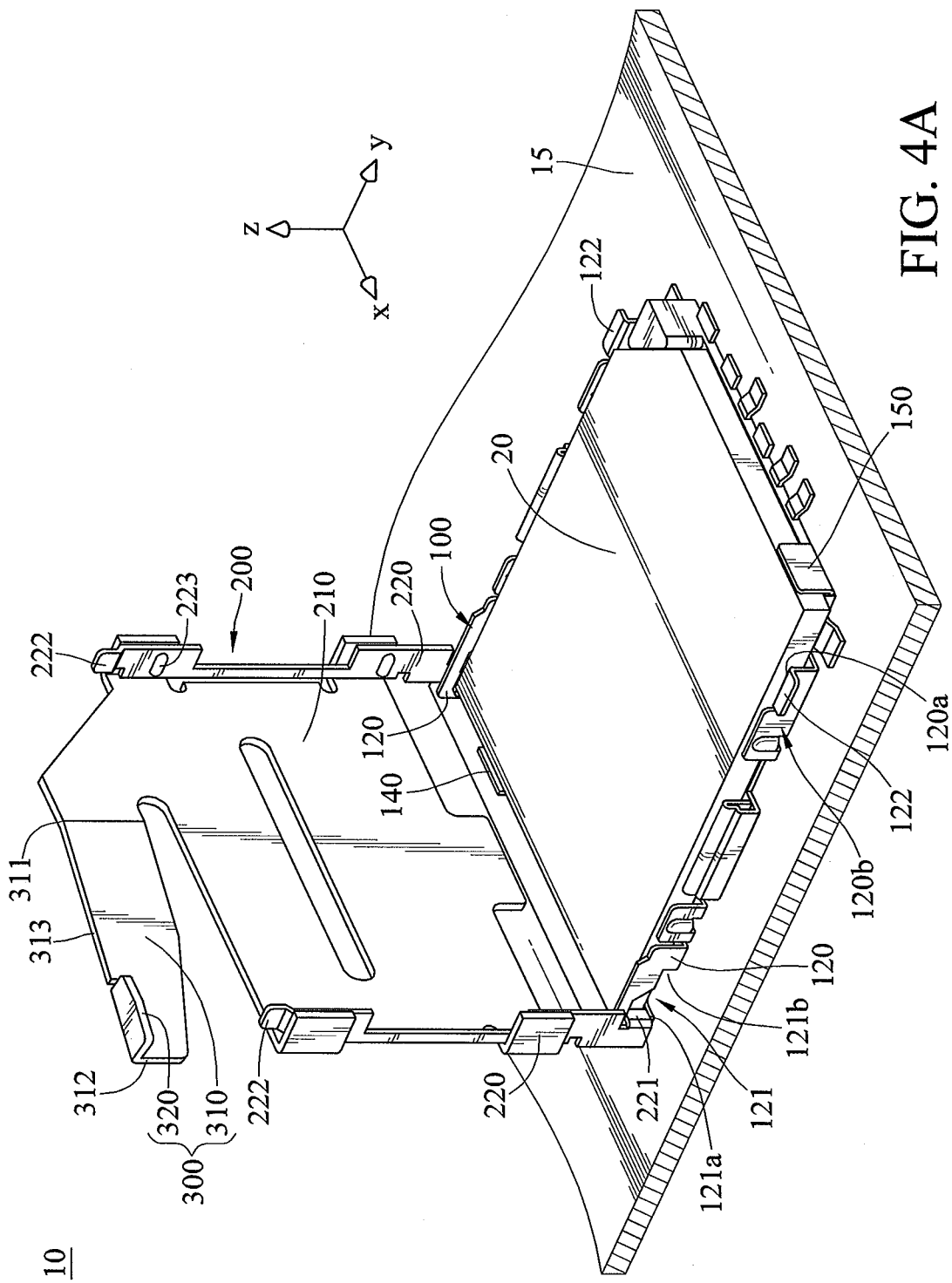
FIG. 4A to FIG. 7B are schematic views of process of fixing the electronic card to the electronic card connector of FIG. 1.
Figure 4B:
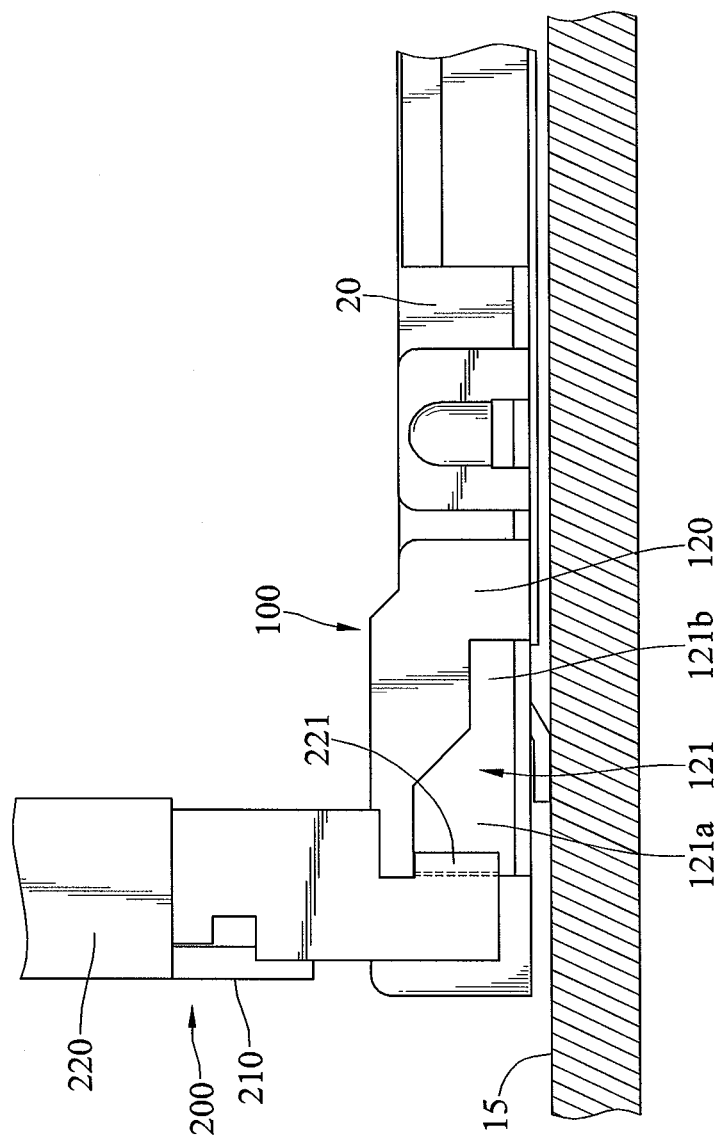

FIG. 4A to FIG. 7B are schematic views of process of fixing the electronic card to the electronic card connector of FIG. 1. As seen in FIG. 4A to FIG. 7B, the pivoting block 221 is located on the pivoting end 121a of the sliding groove 121 (as seen in FIG. 4B), so that the cover 200 is configured for pivoting to the open state relative to the base 100. In addition, the electronic card 20 is placed on the electronic card holder 130 of the base 100 (as shown in FIG. 4A).

Figure 5A:
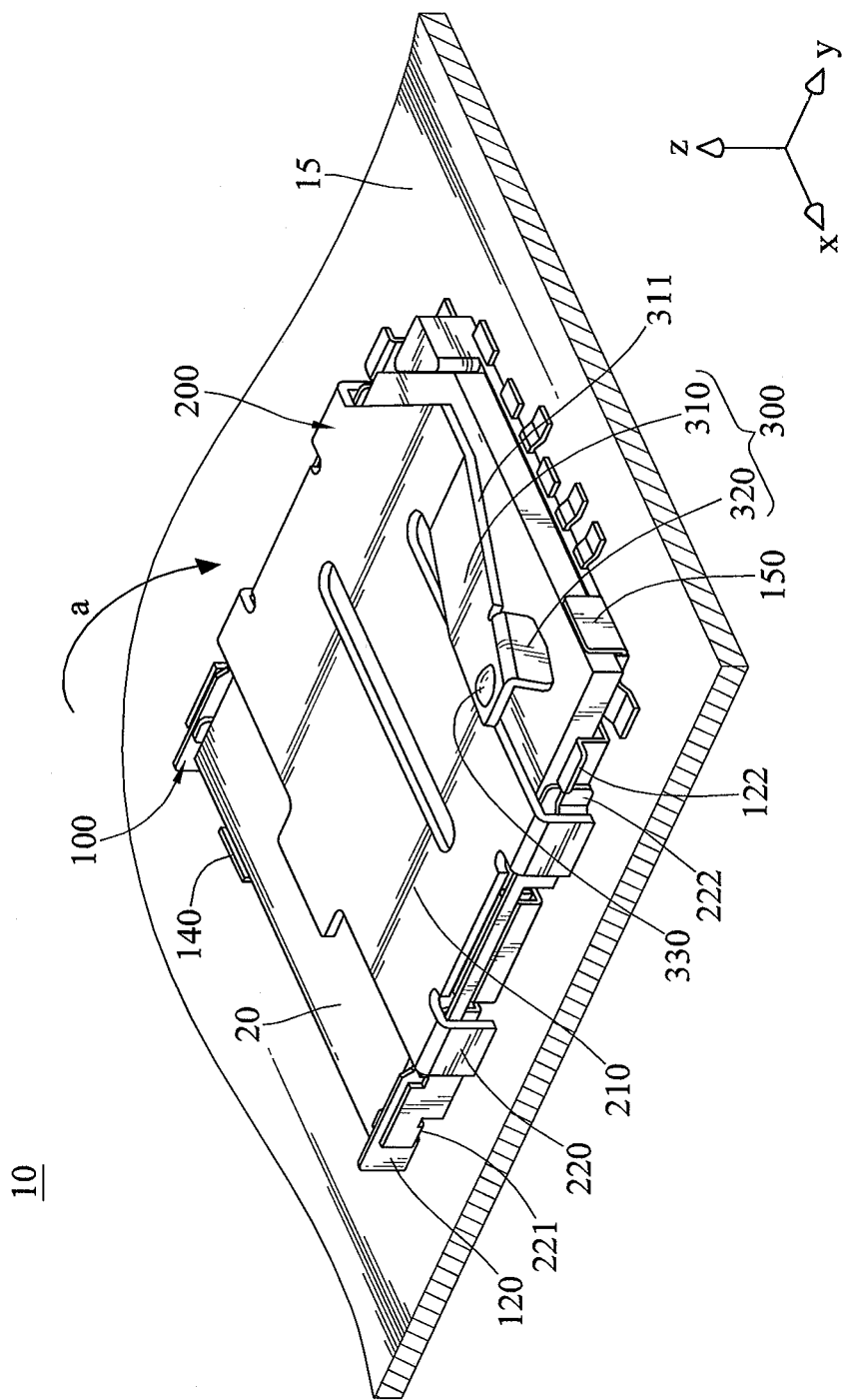
Figure 5B:
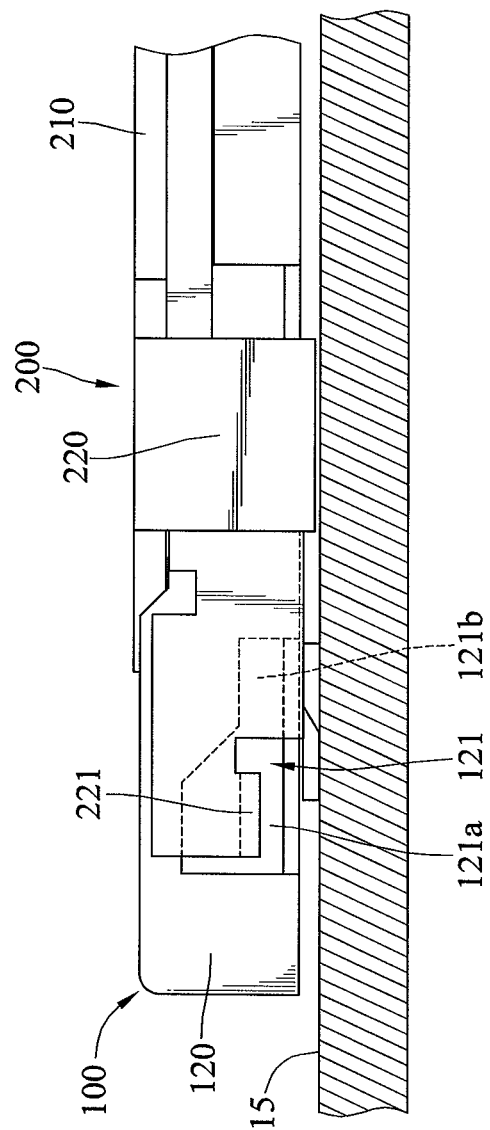

Subsequently, as seen in FIG. 5A and FIG. 5B, the cover 200 is closed (along the direction of arrow a) so that the cover 200 is pivoted to be in the close state.

Figure 6A:
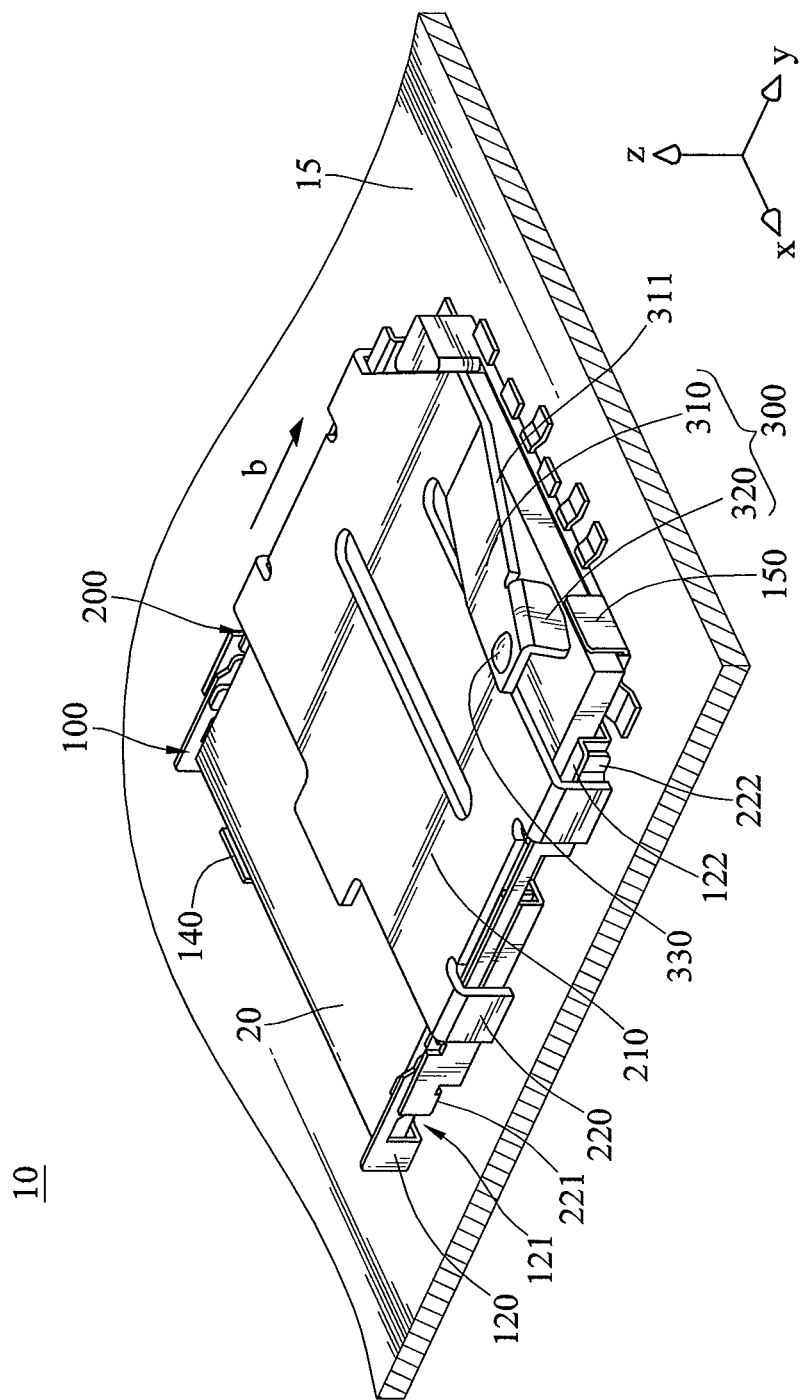
Figure 6B:
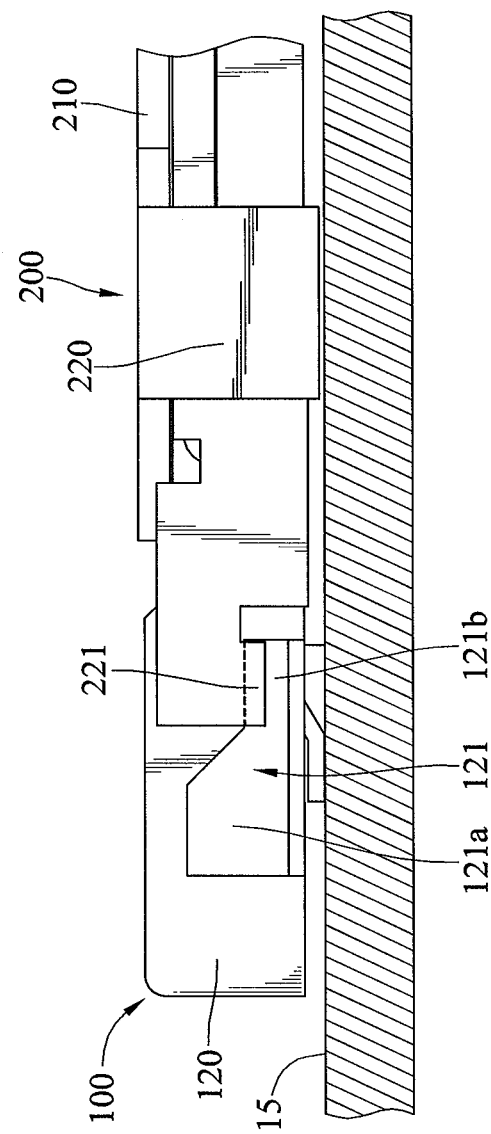
Figure 6C:
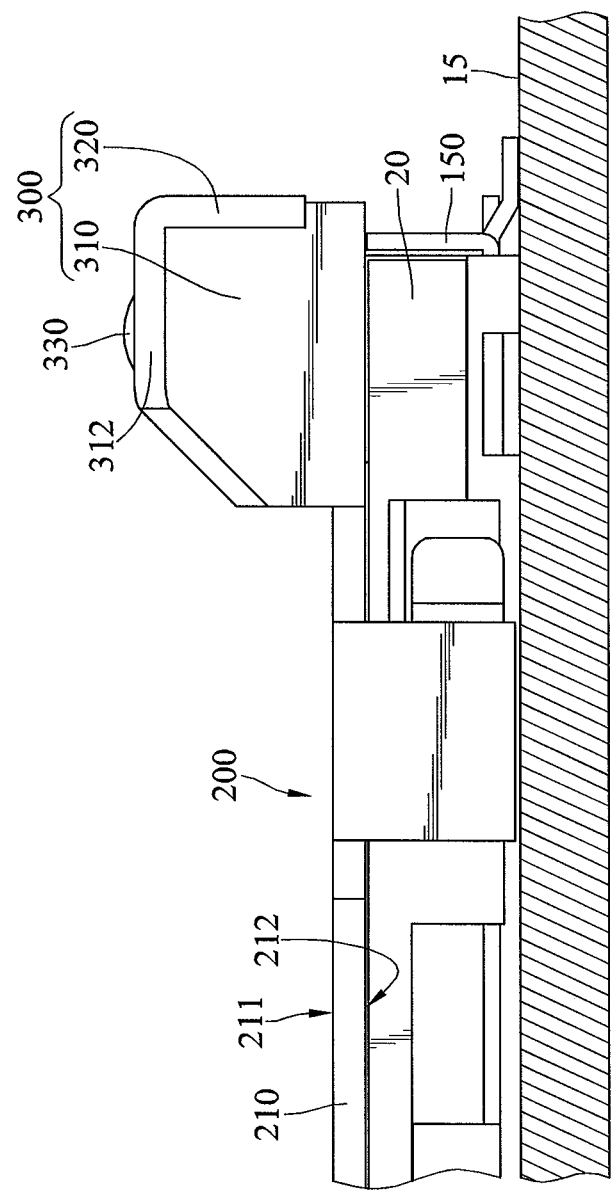

Then, as seen in FIG. 6A to FIG. 6C, the cover 200 is pushed from the release position to the fastening position (along the direction of arrow b). When the cover 200 is located at the fastening position, the pivoting block 221 on one end of the cover 200 is limited by the limiting end 121b of the sliding groove 121 and the second anti-lift portion 222 of other end is limited by the first anti-lift portion 122 of the base 100, thereby limiting the cover 200 rotating to the open state. Additionally, the electronic card 20 is disposed between the top plate 210 of the cover 200 and the bottom plate 110 of the base 100 for limiting the freedom of movement of the electronic card 20 along Z axis. Specifically, the electronic card 20 may touch the bottom plate 110 of the top plate 210 directly or it may be pushed by the elastic conductive terminal of the bottom plate 110 so that it is separated from the bottom plate 110. When the cover 200 is located at the fastening position, the limiting block 320 of the limiting element 300 slides to one side of the electronic card 20 away from the first blocking wall 140. That is, the limiting block 320 moves out from the region above the electronic card 20. Since the limiting element 300 is unstressed (namely in the unstressed state), the position of the limiting block 320 is still above the top side 211 of the top plate 210 (as shown in FIG. 6C).

Figure 7A:
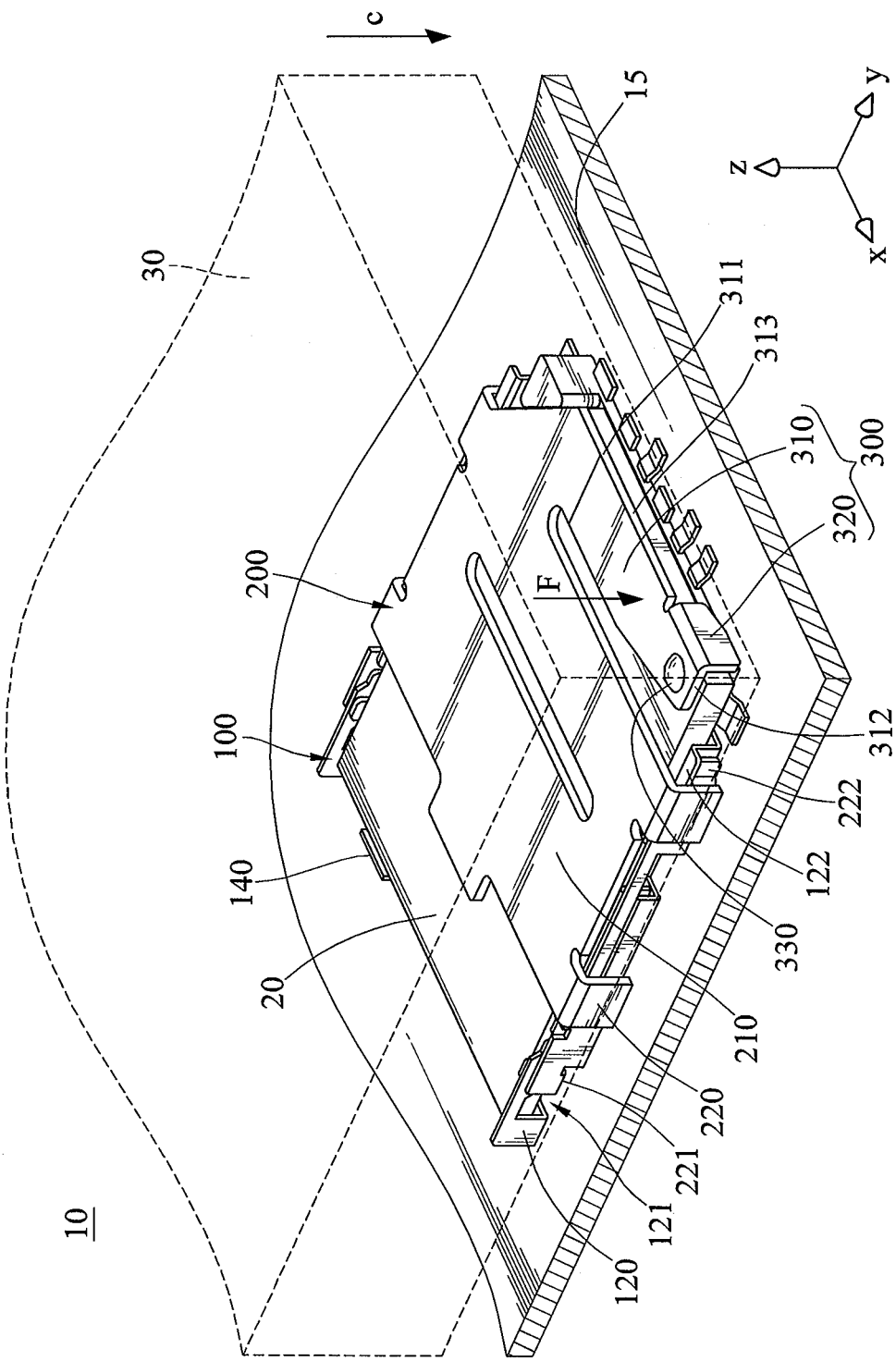
Figure 7B:
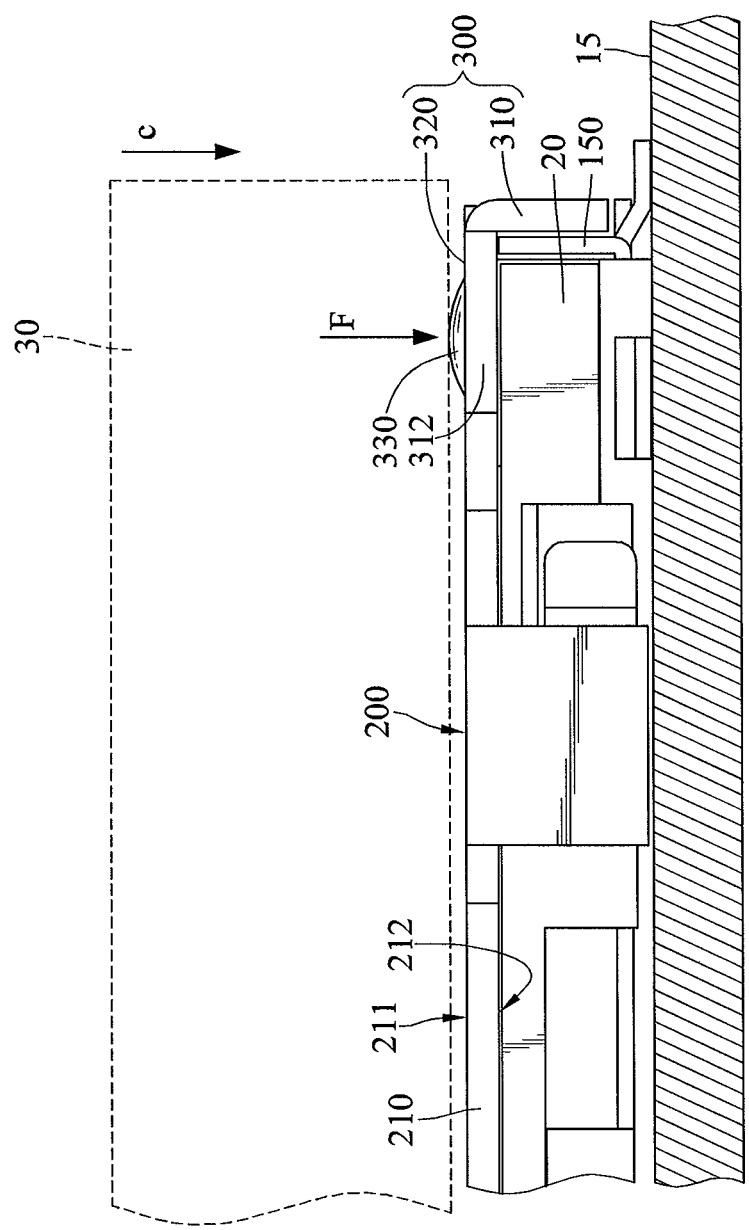

Subsequently, as seen in FIG. 7A and FIG. 7B, when the detachable component 30, such as battery, battery back cover or back cover, is connected to the electronic device which is formed by the electronic card connector 10, the circuit board 15 and the detachable component 30, the detachable component 30 also presses the protruding block 330 of the limiting element 300. The connecting force of the detachable component 30 relative to the electronic device (namely the external force F) forces the elastic arm 310 protruded to elastically deform for ensuring the limiting block 320 on the moving end 312 move downwardly toward the bottom plate 110 so that the elastic arm 310 and the top plate 210 are approximately level. Thus, the limiting block 320 moves from the position above the top side 211 of the top plate 210 to the position below the bottom side 212 and is in stressed state as shown in FIG. 7B, and therefore is interfered with the second blocking wall 150 along the release direction of the cover 200 (namely negative Y axis direction). In one embodiment without the second blocking wall 150, the limiting block 320 may abut on one side of the electronic card 20 away from the first blocking wall 140. This way, the cover 200 is blocked so it is prevented from moving from the fastening position to the release position, which means it is fixed to the fastening position firmly. In this embodiment, the interference between the limiting block 320 and the second blocking wall 150 may prevent the cover 200 from sliding to the release position unintentionally. By comparison, the electronic card 20 can be taken out by detaching the detachable component 30 and then the elastic arm 310 presses the limiting block 320 back to be above the top side 211 because of the elastic resetting force and therefore the interference with the second blocking wall or the side of the electronic card is released. Then, sliding the cover 200 reversely can make the cover 200 open to be in the open state.

Now the comparison of limiting the sliding of the cover 200 by utilizing the interference between the limiting block 320 and the second blocking wall 150 and by friction will be illustrated. When the electronic card connector 10 undergoes drop tests, limiting the cover 200 to the fastening position by friction may result in releasing the fastening relationship because of impacts. In this embodiment, however, unless the detachable component 30 disappears, the limiting block 320 and the second blocking wall 150 are continuously interfered with each other so that the cover 200 is fixed to the fastening position firmly. Thereby, the fastening strength of the cover 200 and the base 100 is enhanced and the electronic card connector 10 can pass drop test of higher standards.

Based on the process illustrated in FIG. 4A to FIG. 7B, the limiting block 320 is floating on one side of the top plate 210 away from the bottom plate 110. Thereby, when the cover 200 is sliding, the limiting block 320 and the electronic card 20 do not interfere with each other so users can install or remove the electronic card 20 easily and conveniently.

Figure 8:
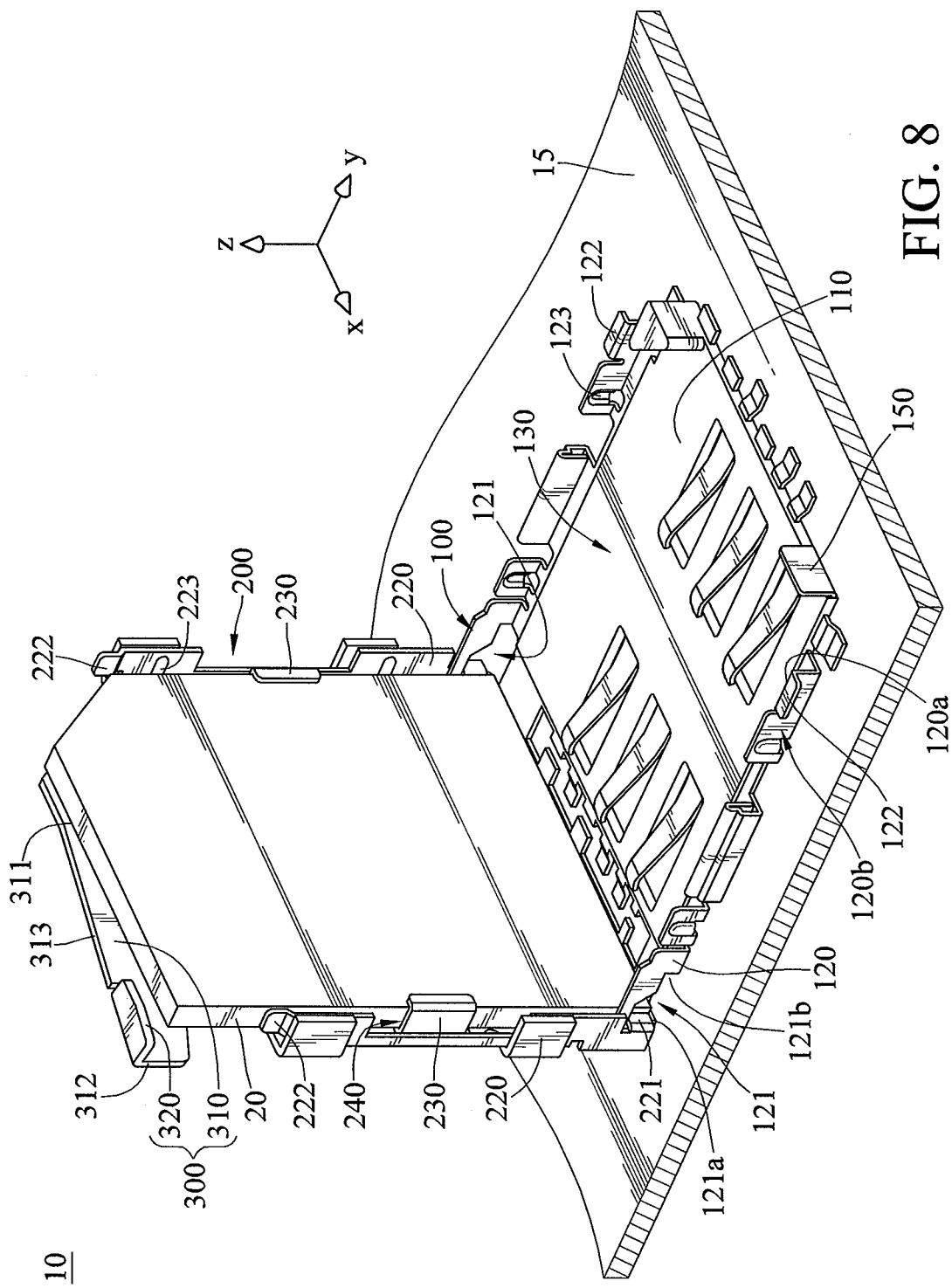
FIG. 8 is a perspective view of an electronic card connector with the electronic card according to the second embodiment of the disclosure.

In this embodiment, the aforementioned electronic card is disposed on the electronic card holder 130, but it is not limited thereto. In other embodiments, the electronic card may be disposed on the cover 200. FIG. 8 is a perspective view of an electronic card connector with the electronic card according to the second embodiment of the disclosure. As seen in FIG. 8, the cover 200 further comprises two hook portions 230 located on opposite two ends of the top plate 210 respectively for making the two hook portions 230 and the top plate 210 together form an electronic card installation slot 240. The electronic card installation slot 240 is for enabling the electronic card 20 to be installed on the cover 200. Since the electronic card 20 slides along with the cover 200, the base 100 of this embodiment needs to equip with the second blocking wall 150. Thereby, the limiting block 320 may be interfered with the second blocking wall 150 for fixing the cover 200 to the fastening position.

Figure 9:
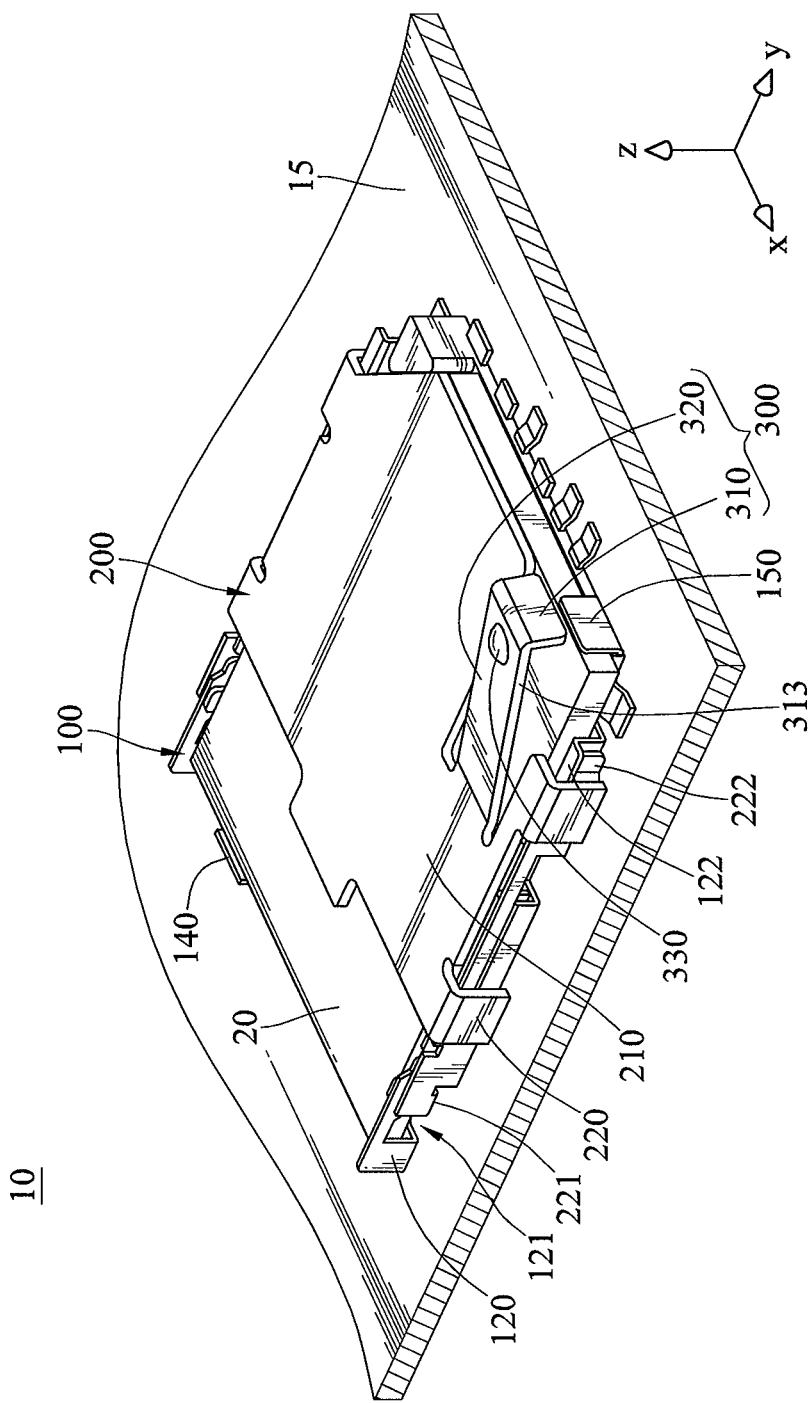
FIG. 9 is a perspective view of an electronic card connector installed on a circuit board of an electronic device according to the third embodiment of the disclosure.

FIG. 9 is a perspective view of an electronic card connector installed on a circuit board of an electronic device according to the third embodiment of the disclosure. This embodiment is similar to the embodiment shown in FIG. 1 and only the differences between them will be illustrated. As seen in FIG. 9, the extending direction of the elastic arm 310 is parallel to the sliding direction of the cover 200 (that is, it is parallel to the Y axis direction).

Figure 10:
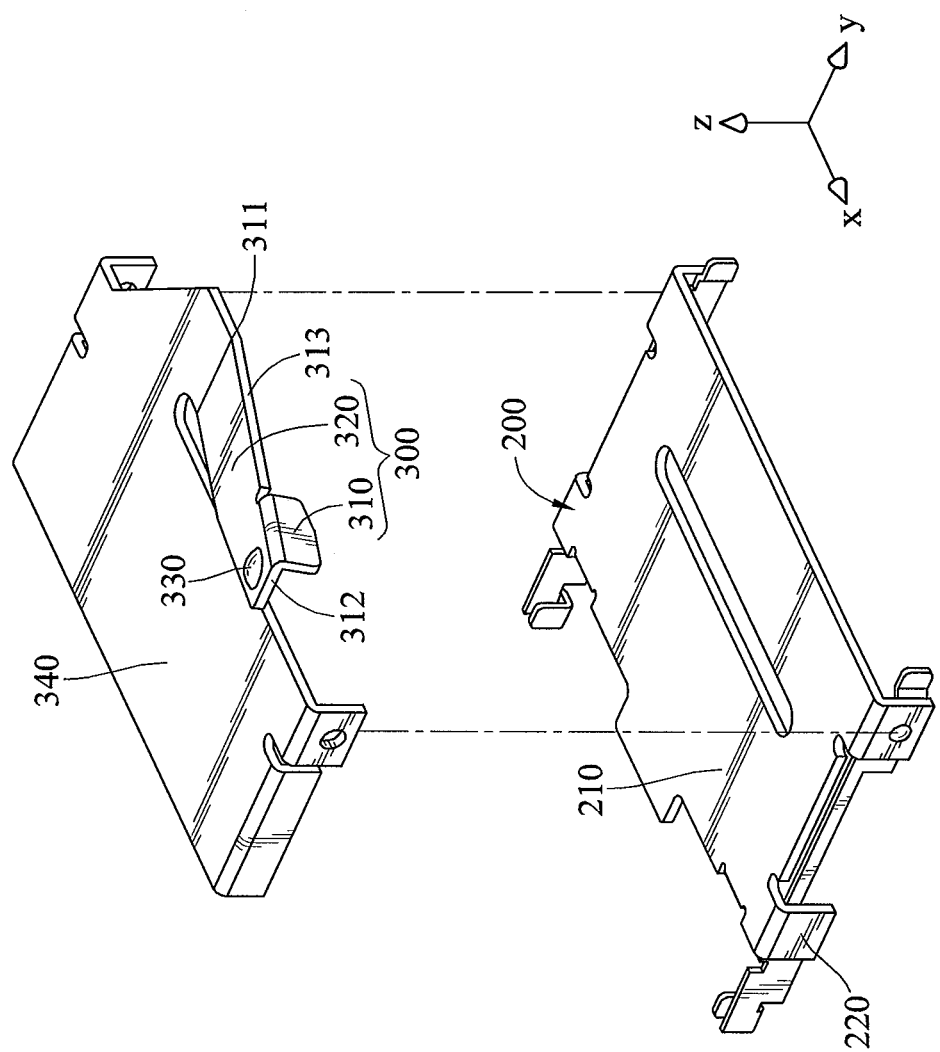
FIG. 10 is an exploded view of a limiting element and a cover according to the fourth embodiment of the disclosure.

FIG. 10 is an exploded view of a limiting element and a cover according to the fourth embodiment of the disclosure. This embodiment is similar to the embodiment shown in FIG. 1 and only the differences between them will be illustrated. As seen in FIG. 10, the limiting element 300 further has an installation portion 340 connected to the elastic arm 310. Additionally, the installation portion 340 is detachably installed on the cover 200 for enabling the limiting element 300 to be installed on the cover 200 without the limiting block 320.

In the electronic card connector of the disclosure and the electronic device with this electronic connector, the interference of the limiting block with the second blocking wall or with the electronic card is used to fix the cover to the fastening position. Thereby, the fastening strength between the cover and the base is considerably enhanced so the electronic card connector can pass the drop test of higher standards.

Moreover, the elastic arm is added between the top plate and the limiting block. Thereby, the assembly and disassembly are much easier and more efficient via the assistance of the elastic arm.

What is claimed is:

1. An electronic card connector comprising:
   a base having an electronic card holder for holding an electronic card;
   a cover being pivoted on the base so that the cover being able to be operated in an open state and a close state relative to the base, wherein the cover is configured to slide relative to the base between a fastening position and a release position when the cover is operated in the close state; and
   a limiting element being connected to the cover and having an unstressed state and a stressed state relative to the cover, wherein the limiting element comprises an elastic arm and at least one limiting block, the elastic arm is connected to the cover via a connecting end while the at least one limiting block is connected to an end other than the connecting end of the elastic arm, and when the elastic arm is in the unstressed state, the position of the at least one block is above the cover, when the elastic arm is in the stressed state, the position of at least a part of the at least one limiting block is below the cover, thus the cover is avoided moving to the release position from the fastening position when the cover is in the close state, so that the cover is fixed at the fastening position accordingly.

2. The electronic card connector according to claim 1, wherein the base comprises a bottom plate and two side walls located on opposite two sides of the bottom plate, to form the electronic card holder surrounded by the two side walls and the bottom plate, the cover comprises a top plate and two side plates located on opposite two sides of the top plate, the elastic arm is connected to the top plate, when the cover is in the close state, the top plate of the cover faces the bottom plate of the base with space between them, and the two side plates of the cover are respectively adjacent to the two side walls correspondingly.

3. The electronic card connector according to claim 2, wherein one end of each of the side walls of the base has a sliding groove, one end of each of the side plates of the cover has a pivoting block correspondingly, the pivoting block is located in the sliding groove in a rotatable and movable manner, so that the cover is configured for being selectively operated in the open state or in the close state relative to the base, and when in the close state, the cover is configured for sliding to the fastening position or the release position relative to the base selectively.

4. The electronic card connector according to claim 3, wherein the shape of the pivoting block is tabular, each of the sliding grooves has a pivoting end and a limiting end, the width of the pivoting end of the groove is greater than the width of the limiting end of the groove, when the cover is at the fastening position, the pivoting block is at the limiting end for making the cover be relatively close to the base, and when the cover is at the release position, the pivoting block is at the pivoting end for enabling the cover to rotate relative to the base.

5. The electronic card connector according to claim 2, wherein each of the side walls of the cover further has a first anti-lift portion, each of the side plates of the base further has a second anti-lift portion correspondingly, when the cover is at the fastening position, the second anti-lift portion is fastened with the first anti-lift portion correspondingly, thereby making the cover remain in the close state, and when the cover is at the release position, the second anti-lift portion separates from the first anti-lift portion for resetting the cover to be in the open state.

6. The electronic card connector according to claim 2, wherein the cover further comprises two hook portions, the two hook portions are located on opposite two sides of the top plate respectively for making the two hook portions and the top plate together form a electronic card installation slot, for accommodating the electronic card when the cover is in the open state and for covering the base to form the close state.

7. The electronic card connector according to claim 2, wherein each of the side walls of the cover further has a first non-slip portion, each of the side plates of the base further has a second non-slip portion correspondingly, when the cover is at the fastening position, the first non-slip portion is fastened with the second non-slip portion correspondingly for fixing the cover to the fastening position.

8. The electronic card connector according to claim 1, wherein the release position of the cover is near the side of the cover pivoted on the base while the fastening position is near the other side which is away from the side of the cover pivoted on the base, and the limiting element is disposed on the cover and is near the other side.

9. The electronic card connector according to claim 8, wherein the base further comprises a first blocking wall located on one side of the electronic card holder and near the side of the cover pivoted on the base, for blocking the electronic card, when the cover is at the fastening position and the limiting element is in the stressed state, the elastic arm elastically deforms for blocking the limiting block to be at the side of the electronic card away from the first blocking wall, thereby fixing the cover to the fastening position.

10. The electronic card connector according to claim 8, wherein the base further comprises a first blocking wall and a second blocking wall which are located on opposite two sides of the electronic card holder respectively for blocking the electronic card, when the cover is at the fastening position and the limiting element is in the pressed state, the elastic arm elastically deforms for blocking the limiting block to be at the second blocking wall for fixing the cover to the fastening position.

11. The electronic card connector according to claim 1, wherein the extending direction of the elastic arm is parallel to the sliding direction of the cover.

12. The electronic card connector according to claim 1, wherein the extending direction of the elastic arm is perpendicular to the sliding direction of the cover.

13. The electronic card connector according to claim 1, further comprising an installation portion, wherein the limiting portion is disposed on the installation portion and the installation portion is installed on the cover in a detachable way.

14. The electronic card connector according to claim 1, wherein the at least one limiting block is connected to a moving end of the elastic arm opposite to the connecting end.

15. The electronic card connector according to claim 1, wherein the connection of the at least one limiting block and the elastic arm is in a perpendicular shape.

16. An electronic device comprising:
a circuit board;
a detachable component connected to the electronic device in a detachable manner; and
an electronic card connector disposed and electrically connected to the circuit board, comprising:
a base having an electronic card holder for holding an electronic card;
a cover being pivoted on the base so that the cover being able to be operated in an open state and a close state relative to the base, wherein the cover is configured to slide relative to the base between a fastening position and a release position when the cover is operated in the close state; and
a limiting element being connected to the cover and having an unstressed state and a stressed state relative to the cover, wherein the limiting element comprises an elastic arm and at least one limiting block, the elastic arm is connected to the cover via a connecting end while the at least one limiting block is connected to an end other than the connecting end of the elastic arm, and when the elastic arm is in the unstressed state, the position of the at least one block is above the cover, when the elastic arm is in the stressed state, the position of at least a part of the at least one limiting block is below the cover, thus the cover is avoided moving to the release position from the fastening position when the cover is in the close state, so that the cover is fixed at the fastening position accordingly;

wherein when the detachable component is connected to the electronic device, the detachable component presses the limiting element to generate the pressed state, and when the detachable component is removed from the electronic device, the detachable component no longer presses the limiting element, thereby generating the unstressed state.

17. The electronic device according to claim 16, wherein the detachable component is a battery, a battery back cover or a back cover.

18. The electronic device according to claim 16, wherein the release position of the cover is near the side of the cover pivoted on the base while the fastening position is near the other side which is away from the side of the cover pivoted on the base, and the limiting element is disposed on the cover and is near the other side.

19. The electronic device according to claim 18, wherein the base further comprises a first blocking wall located on one side of the electronic card holder and near the side of the cover pivoted on the base, for blocking the electronic card, when the cover is at the fastening position and the limiting element is in the stressed state, the elastic arm elastically deforms for blocking the limiting block to be at the side of the electronic card away from the first blocking wall, thereby fixing the cover to the fastening position.

20. The electronic device according to claim 18, wherein the base further comprises a first blocking wall and a second blocking wall which are located on opposite two sides of the electronic card holder respectively for blocking the electronic card, when the cover is at the fastening position and the limiting element is in the pressed state, the elastic arm elastically deforms for blocking the limiting block to be at the second blocking wall for fixing the cover to the fastening position.

21. The electronic device according to claim 16, wherein the extending direction of the elastic arm is parallel to the sliding direction of the cover.

22. The electronic device according to claim 16, wherein the extending direction of the elastic arm is perpendicular to the sliding direction of the cover.

23. The electronic device according to claim 16, wherein the at least one limiting block is connected to a moving end of the elastic arm opposite to the connecting end.

* * * * *